(12) United States Patent  (10) Patent No.: US 6,679,511 B2
Parker et al.  (45) Date of Patent: Jan. 20, 2004

(54) HEAVY EQUIPMENT TRANSPORTER

(76) Inventors: Donald M. Parker, 69 Peaceful Valley Dr., Cleveland, GA (US) 30528; Merl P. Parker, 69 Peaceful Valley Dr., Cleveland, GA (US) 30528

( * ) Notice: Subject to any disclaimer, the term of this patent is extended or adjusted under 35 U.S.C. 154(b) by 0 days.

(21) Appl. No.: 10/141,048

(22) Filed: May 8, 2002

(65) Prior Publication Data
US 2003/0209898 A1 Nov. 13, 2003

(51) Int. Cl.$^7$ ................................................. B60F 1/00
(52) U.S. Cl. ................................. 280/415.1; 280/491.1
(58) Field of Search ............................... 280/404, 408, 280/415.1, 491.1, 495, 496

(56) References Cited

U.S. PATENT DOCUMENTS

| | | | |
|---|---|---|---|
| 2,639,926 A | 5/1953 | Parks | 280/47.15 |
| 2,794,565 A | 6/1957 | Ratliff | 214/394 |
| 2,995,261 A | 8/1961 | Soyland et al. | 214/138 |
| 3,101,854 A | 8/1963 | Kampert | 214/138 |
| RE25,495 E | 12/1963 | Soyland et al. | 214/138 |
| 3,169,650 A | 2/1965 | Soyland | 214/138 |
| 3,333,718 A | 8/1967 | Durham | 214/778 |
| 3,345,083 A | * 10/1967 | Roberson | 280/490.1 |
| 3,594,018 A | 7/1971 | Graetz | 214/415 R |
| 3,656,780 A | 4/1972 | Nordstrom | 214/415 R |
| 4,037,681 A | 7/1977 | Gorby | 180/44 R |
| 4,081,090 A | 3/1978 | Hopkins | 214/38 R |
| 4,523,771 A | * 6/1985 | Bender | 280/474 |
| 4,936,596 A | * 6/1990 | Edwards | 280/404 |
| 5,056,984 A | 10/1991 | Hesterman | 414/685 |
| 5,215,425 A | 6/1993 | Hambright | 414/481 |
| 5,465,993 A | * 11/1995 | Gee et al. | 280/491.5 |
| 5,601,303 A | 2/1997 | Underwood | |

* cited by examiner

Primary Examiner—Lesley D. Morris
Assistant Examiner—L. Lum
(74) Attorney, Agent, or Firm—Hinkle & O'Bradovich, LLC

(57) ABSTRACT

A heavy equipment (such as a tractor loader backhoe) transporter is disclosed. The transporter apparatus includes a tongue assembly and a rear axle assembly. The tongue assembly is adapted to connect to the front of the heavy equipment and the rear axle assembly is adapted to connect to the rear of the heavy equipment. When the assemblies are connected to the heavy equipment, a new unitary trailer is formed.

16 Claims, 6 Drawing Sheets

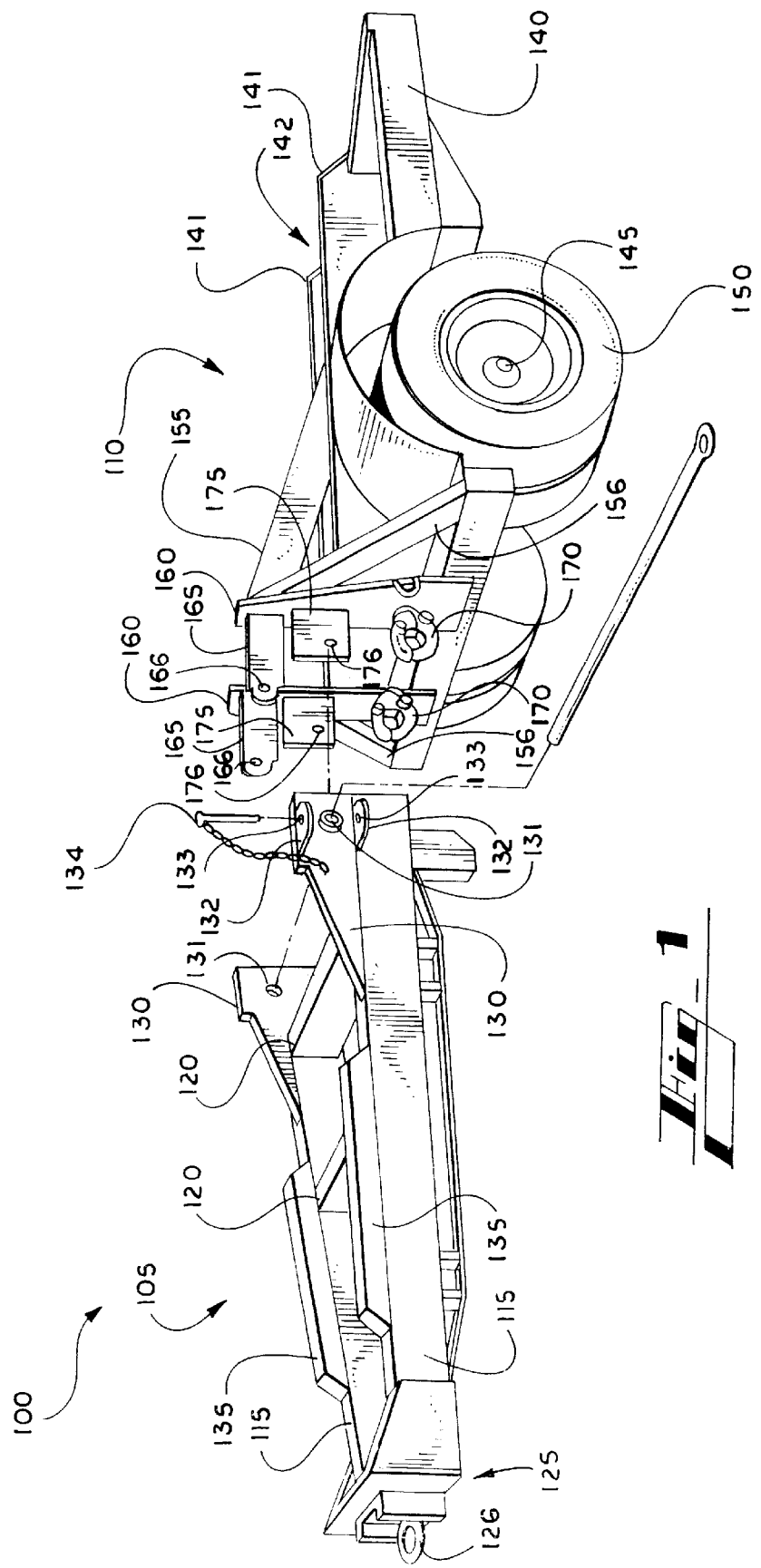

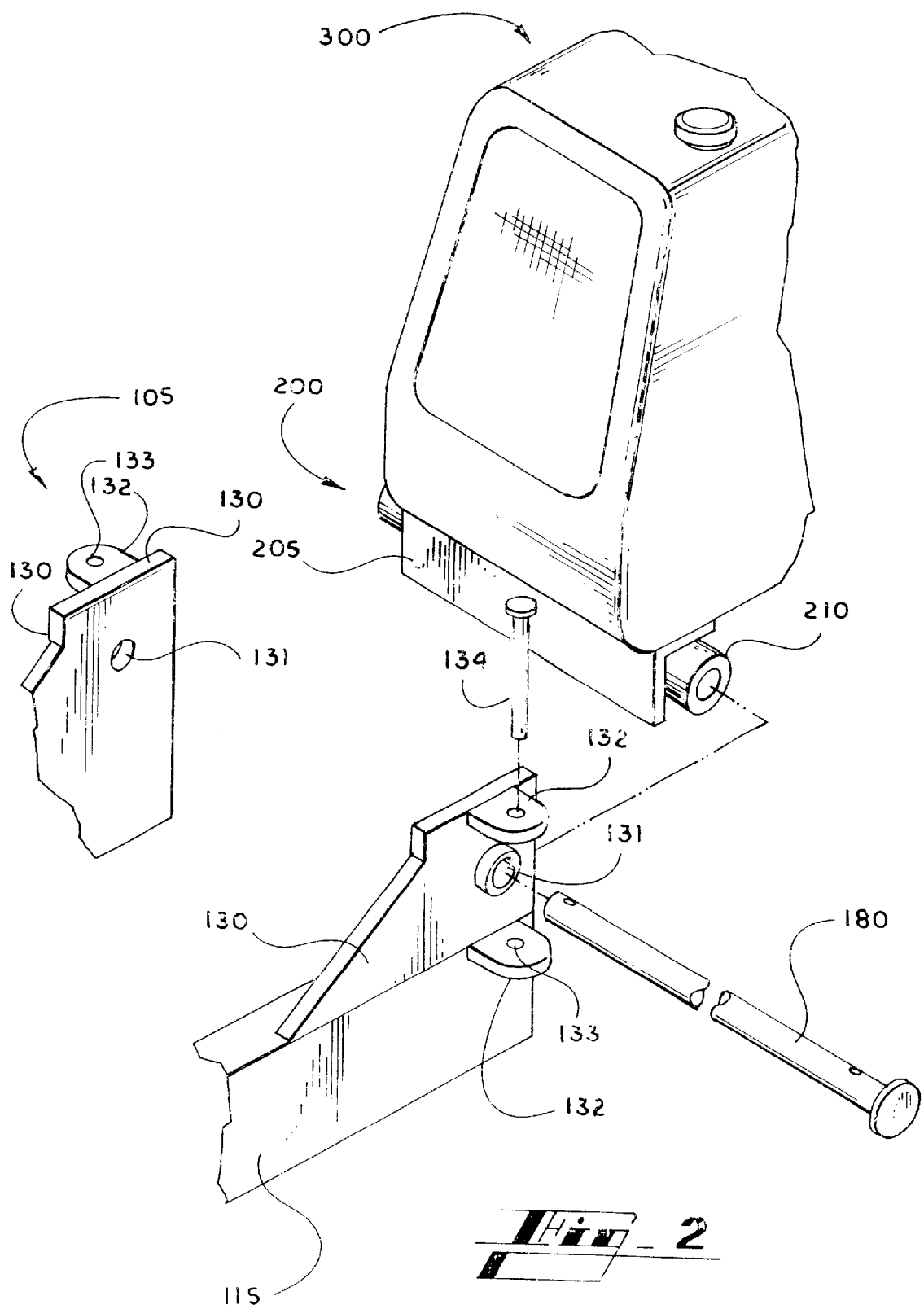

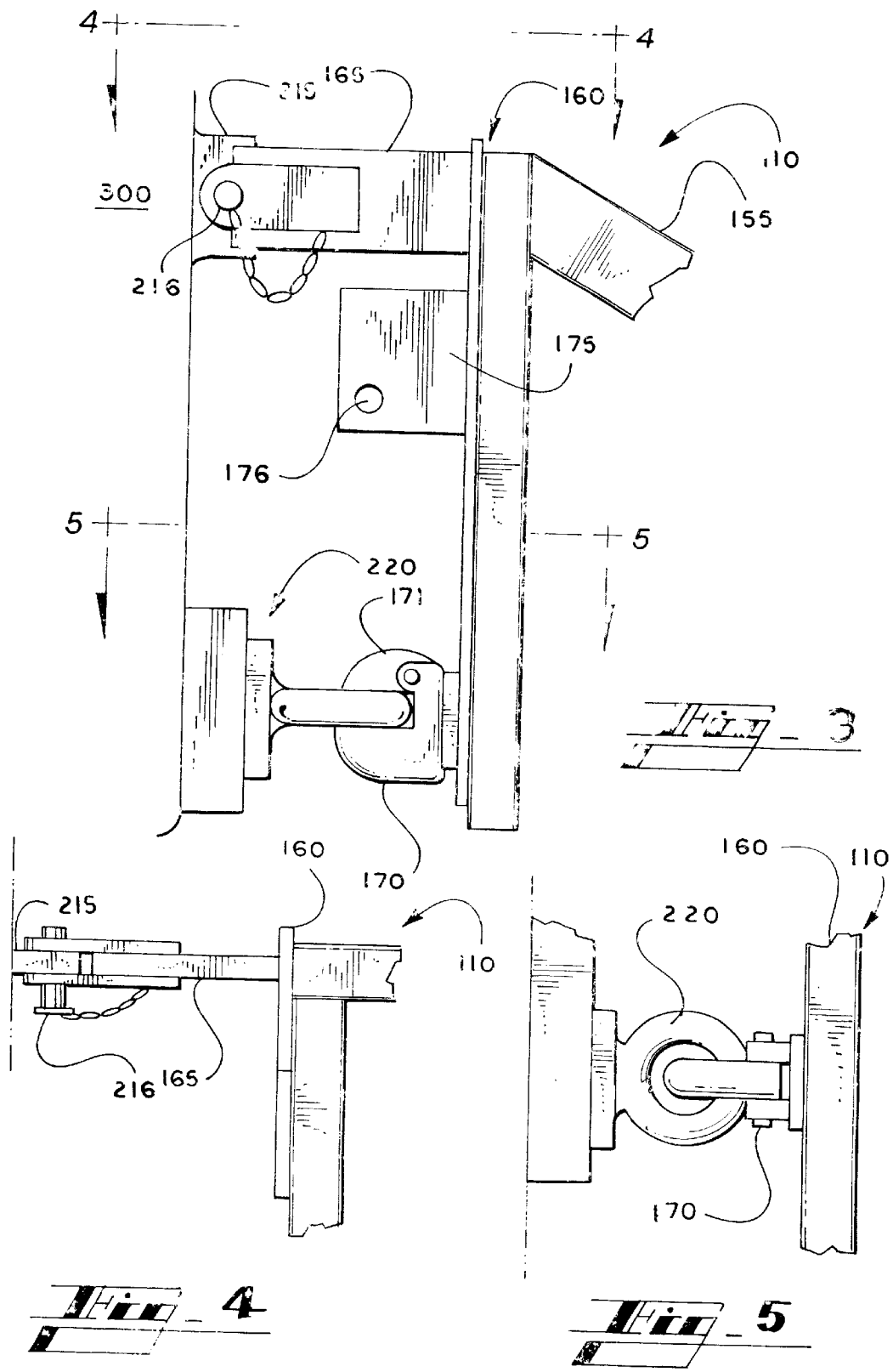

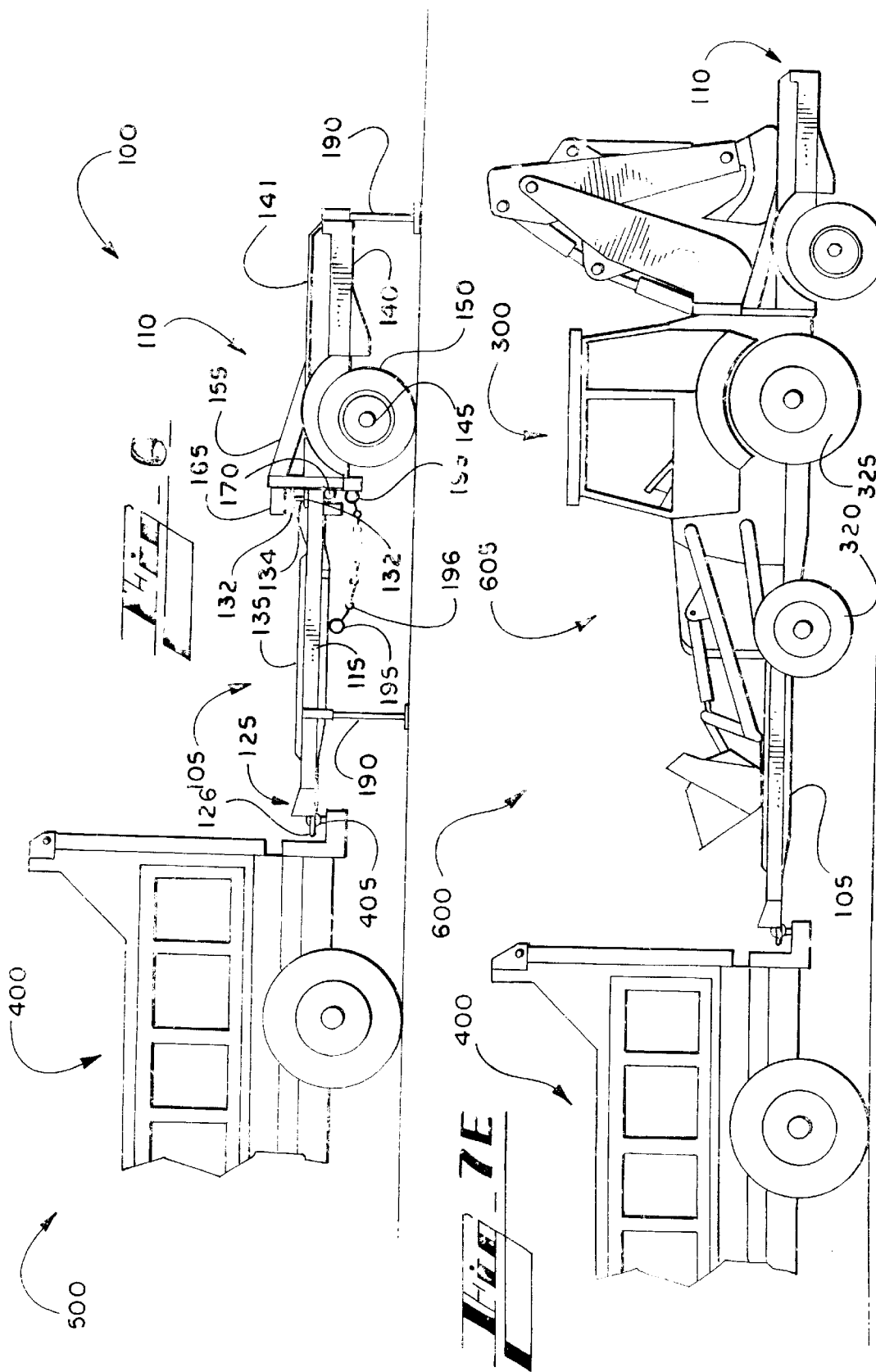

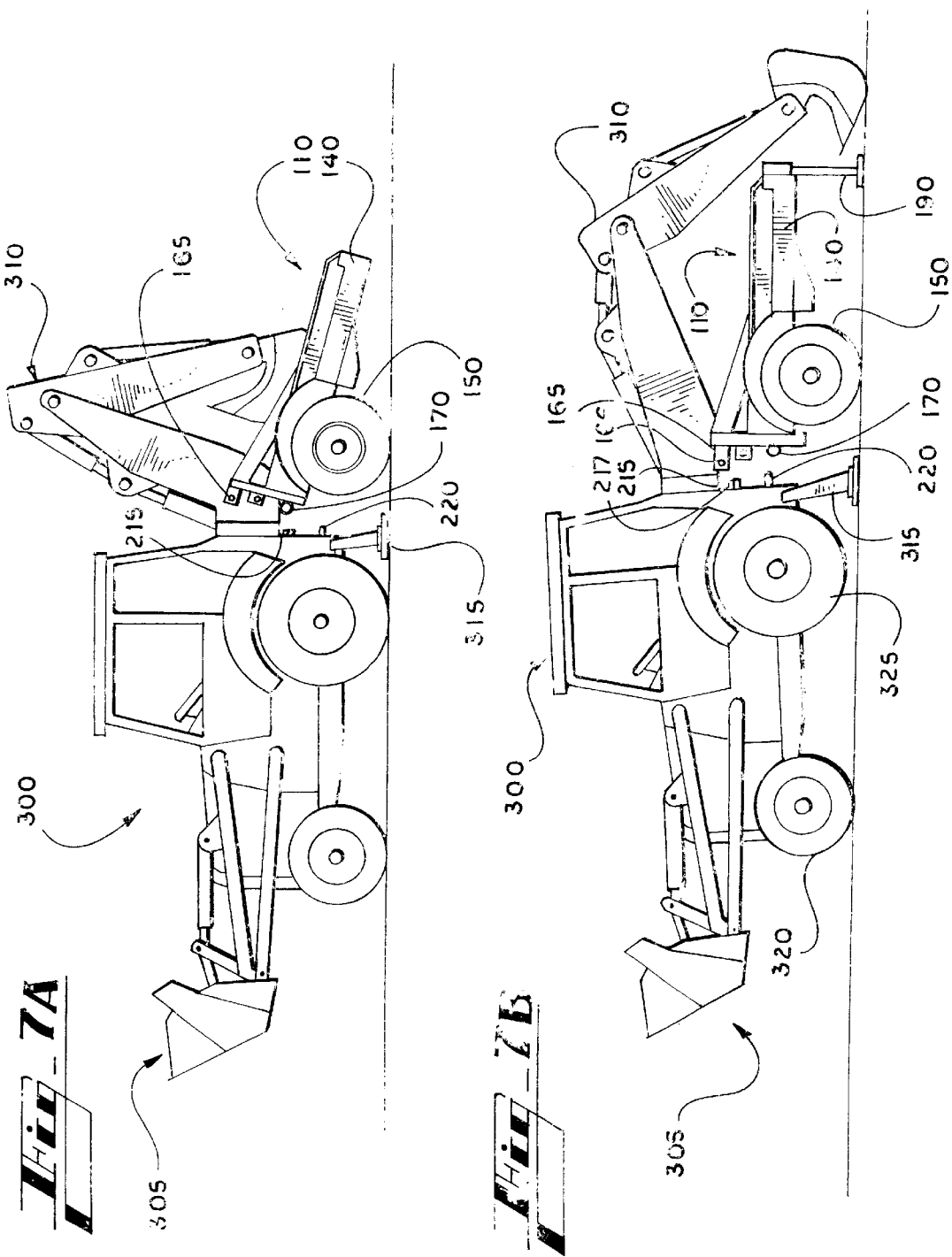

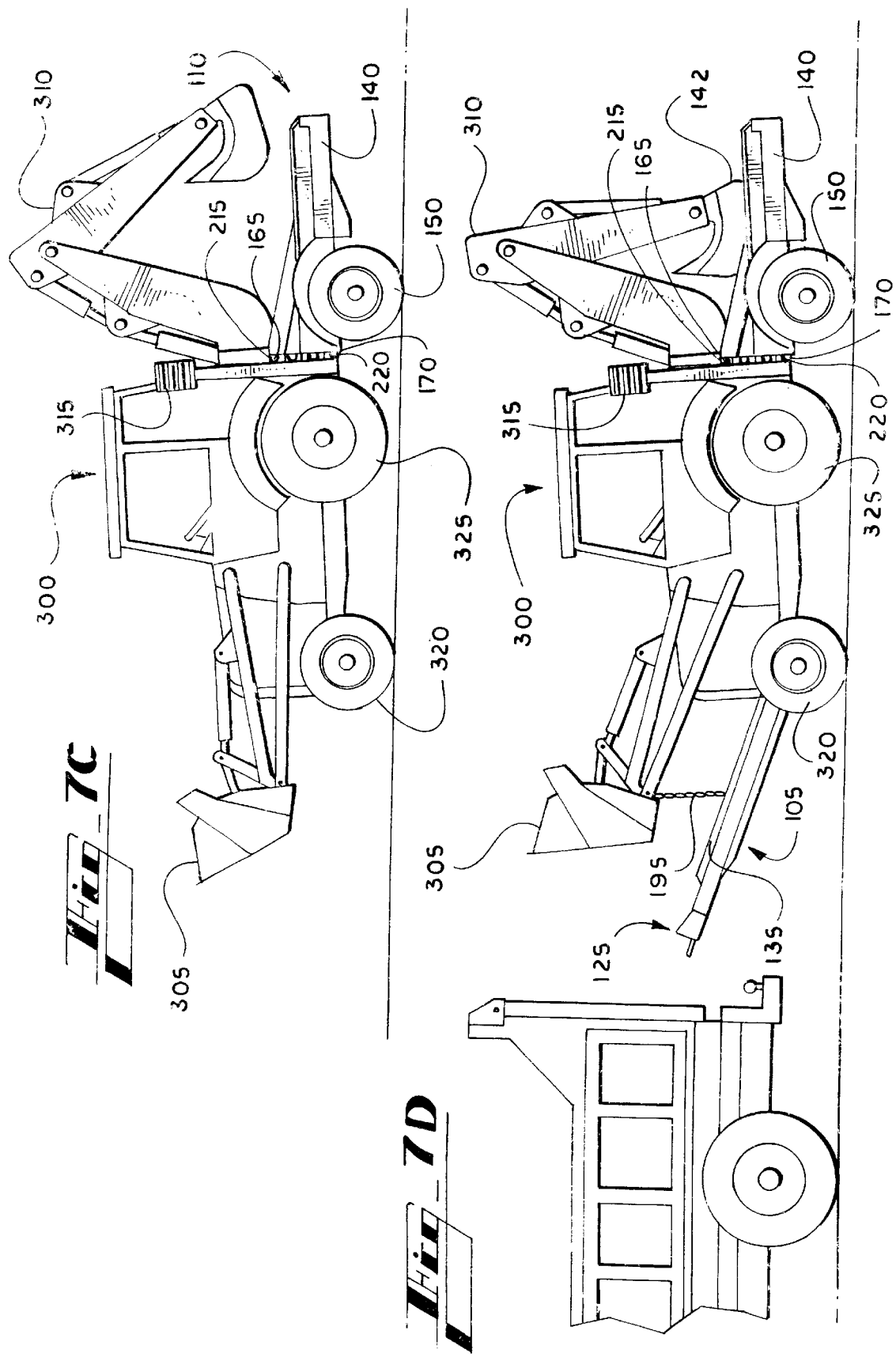

HEAVY EQUIPMENT TRANSPORTER

BACKGROUND OF THE INVENTION

I. Field of the Invention

The present invention relates generally to the field of heavy equipment and more particularly to a transformable heavy equipment transporter apparatus.

II. Description of the Related Art

Heavy construction equipment such as tractor loader backhoes are typically transported on flatbed trailers. These trailers are typically high from the ground, wide and have long wheelbases. When the equipment is brought to the work site and unloaded, the trailer is typically parked close to the work site, which, in turn can take up limited space. Due to the height of the trailer, unloading the equipment can often be tedious and awkward. The trailers can also be driven back to the point of origin. When driving a loaded or unloaded trailer, the trailer can often weave and move side to side on the road at only moderately high speeds.

SUMMARY OF THE INVENTION

In general, the invention features a heavy equipment transporter.

In general, in one aspect, the invention features a heavy equipment transporter apparatus, including a tongue assembly having a first end and a second end, the tongue assembly including two elongated side beams and a plurality of cross beams connected between the side beams and a rear axle assembly connected to the tongue assembly, the rear axle assembly including a mainframe having a first end and a second end.

In one implementation, the apparatus includes a first set of interconnection plates having aligned holes and connected to the upper portion of the second end of the side beams and a second set of interconnection plates having aligned holes and connected to the first end of the mainframe of the rear axle assembly, wherein the holes on the first and second interconnection plates are adapted to be aligned and are further adapted to receive an elongated rod through the holes.

In another implementation, the second set of interconnection plates are each connected to a respective support plate having an upper and lower end, the support plates being substantially parallel and connected substantially perpendicular to the mainframe.

In another implementation, the apparatus further includes upper support devices connected to the upper ends of the support plates and lower support devices connected to the lower ends of the support plates.

In another implementation, the rests located on the upper portion of the side beams.

In another implementation, the apparatus includes two parallel side walls located on the mainframe of the rear axle assembly forming an elongated space between the walls.

In still another implementation, the apparatus includes an axle connected to the mainframe and wheels connected to the axle.

In another implementation, the axle is a single axle dual tires.

In yet another implementation, the apparatus includes a hauling assembly connected to the first end of the tongue assembly.

In another aspect, the invention features a heavy equipment transporter kit, including a transporter having a tongue assembly and a rear axle assembly, the rear axle assembly having an upper and lower support device, a rear axle connection assembly adapted to be permanently connected to the rear of heavy equipment and a tongue connection assembly adapted to be permanently connected to the front of heavy equipment.

In one implementation, the rear axle connection assembly comprises an upper support device and a lower support device, the upper and lower support devices being adapted to reciprocally interconnect with the upper and lower support devices of the rear axle assembly.

In another implementation, the tongue connection assembly comprises an angle plate adapted to permanently connect to the unitized mainframe of heavy equipment and a sleeve connected to the angle plate.

In another implementation, the rear axle connection assembly is connected to the unitized mainframe of the heavy equipment.

In another aspect, the invention features a trailer, including a unitized mainframe of a front end loader backhoe, the mainframe having a front end and a rear end, a tongue assembly connected to the front end of the unitized mainframe and a rear axle assembly connected to the rear end of the unitized mainframe.

In another aspect, the invention features a heavy equipment transporter system, including a heavy equipment transporter apparatus having a tongue assembly and a rear axle assembly, a piece of heavy equipment having two ends, wherein the tongue assembly is connected to one and of the piece of heavy equipment and the rear axle assembly is connected to the other end of the piece of heavy equipment and a transporter vehicle connected to the tongue assembly.

In another aspect, the invention features a method of preparing a tractor loader backhoe for transportation, including providing a rear axle assembly having upper and lower support devices, extending the backhoe of the tractor having upper and lower support devices, the back hoe being extended over the rear axle assembly, lifting the rear wheels of the tractor by pressing the backhoe into the ground, aligning and resting the tractors lower support devices on the lower support devices on the rear axle assembly, aligning and connecting the upper support devices of the rear axle assembly and the tractor, driving the tractor using the front wheels to a tongue assembly, connecting the tongue assembly to the front end loader of the tractor, lifting the tongue assembly and connecting it to a tongue connection assembly on the tractor, connecting the tongue assembly to a transporting vehicle and pressing down on the tongue assembly with the front end loader to lift the front wheels of the tractor off the ground.

In one implementation, the methods further includes optionally extending the stabilizers of the tractor when connecting the rear axle assembly to the tractor.

In another implementation, the method further includes optionally extending the backhoe while pressing down on the tongue assembly.

In another implementation, the method further includes resting the backhoe on the rear axle assembly.

In another implementation, the method further includes securing the front wheels to the front end loader.

One advantage of the invention is that it removes the need for a flatbed trailer by making the heavy equipment into part of the transporter itself.

Another advantage of the invention is that the transporter is closer to the ground, thereby lowering the center of gravity reducing weaving and unwanted side to side movement while transporting the heavy equipment.

Another advantage is that the lower center of gravity creates further stability of the transporter apparatus when in turns and when decelerating.

Another advantage is that the lower ground clearance creates more overpass clearance for the apparatus.

Another advantage is that the transporter, when removed from the heavy equipment is compact and can be stored remotely and can be transported more compactly when the heavy equipment is removed.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 illustrates a view of an embodiment of a transformable heavy equipment transporter;

FIG. 2 illustrates a close up view of a portion of an embodiment of a front tongue assembly;

FIG. 3 illustrates a close up view of a portion of an embodiment of a rear axle assembly;

FIG. 4 illustrates a close up alternate view of a portion of an embodiment of a rear axle assembly;

FIG. 5 illustrates a close up alternate view of a portion of an embodiment of a rear axle assembly;

FIG. 6 illustrates a side view of an embodiment of a heavy equipment transporter system;

FIG. 7A illustrates a side view of tractor loader backhoe and an embodiment of a rear axle assembly;

FIG. 7B illustrates another side view of tractor loader backhoe and an embodiment of a rear axle assembly;

FIG. 7C illustrates yet another side view of tractor loader backhoe and an embodiment of a rear axle assembly;

FIG. 7D illustrates a side view of a tractor loader backhoe, an embodiment of a rear axle assembly and an embodiment of a front tongue assembly; and FIG. 7E illustrates a side view of an embodiment of a heavy equipment transporter/transformer system.

DETAILED DESCRIPTION OF THE INVENTION

Transporter Apparatus

Referring to the drawings wherein like reference numerals designate corresponding parts throughout the several figures, reference is made first to FIG. 1 that illustrates a view of an embodiment of a transformable heavy equipment transporter apparatus 100. The apparatus 100 is typically constructed of steel. The apparatus 100 generally includes a tongue assembly 105 and a rear axle assembly 110.

The tongue assembly 105 includes two elongated side beams 115 and several cross beams 120 connected to the side beams 115. A hauling assembly 125 is connected to one end of the tongue assembly 105. The hauling assembly 125 can be any assembly adapted to be connected to a transporting vehicle such as a flatbed truck, dump truck or any suitable transporting vehicle. The hauling assembly 125 can be adapted to accommodate a pintle hook (not shown) by including a drawbar 126 as shown in the figure. It is understood that any suitable modifications can be made to include other types of hauling assemblies. For example, in another embodiment, the hauling assembly 125 can be adapted for a "gooseneck" hook up.

Interconnection plates 130 are connected to the upper portion of the other end of the side beams 115. The interconnection plates 130 typically include holes 131. Pin plates 132 are located above and below the holes 131. The pin plates 132 can include holes 133. The tongue assembly 105 can also include front loader rests 135. The front loader rests 135 can be constructed of a wear material such as steel. The front loader rests are described in more detail below with respect to the operation of the transporter apparatus 100.

The rear axle assembly 110 generally includes a mainframe 140, an axle 145 (partially shown) connected to the main frame 140 and wheels 150 connected to the axle 145. In one implementation, the axle 145 can be a single axle dual tires. The mainframe 140 can include two side walls 141 that are substantially parallel to each other and create a backhoe clearance space 142 that is described in further detail below with respect to the operation of the transporter apparatus 100. Support beams 155 connect at an angle between the side walls 141 and to support plates 160. The support plates 160 are substantially parallel to each other and substantially perpendicular to the mainframe. Additional support beams 156 are connected between the main frame 140 and the support plates 160.

The support plates 160 include upper support devices 165 and lower support devices 170. In one embodiment, the upper support devices are plates that include holes 166 as shown in the figure. In an embodiment, the lower support devices 170 can be hooks such as pintle hooks as illustrated. The upper and lower support devices 165, 170 are described in further detail below with respect to the operation of the transporter apparatus 100. It is understood that other types of devices can be implemented in the upper and lower support devices 165, 170. Two substantially parallel and aligned interconnection plates 175 including holes 176 are located between the upper and lower support devices 165, 170.

The tongue and rear axle assemblies 105, 100 can be connected together by aligning the holes 176 on interconnection plates 175 with the holes 131 on interconnection plate 130 and inserting an elongated rod 180 through the aligned holes 131, 176. The rod 180 can be secured by inserting a pin 134 through the holes 133 on pin plates 132. The connection of the tongue and rear axle assemblies 105, 110 provides the compactness of the apparatus 100. While transporting the apparatus without heavy equipment as shown, the tongue assembly 105 can also be chained to the rear axle assembly 110 in a variety of ways. For example, "eyes" (not shown) can be provided on the lower portions of the tongue and rear axle assemblies 105, 100. A chain and binder can be connected and secured to each of the eyes providing necessary stability while transporting the apparatus 100 by itself.

FIG. 2 illustrates a close up view of a portion of an embodiment of a front tongue assembly 105. As discussed above, the side beams 115 and interconnection plates 130 are shown. A front portion of tractor 300 is also shown. In an embodiment, the tractor 300 is of the type that includes a unitized mainframe. A tongue connection assembly 200 is connected to the lower portion of the tractor 300 on the unitized mainframe. The tongue connection assembly 200 includes a angle plate 205 connected to the tractor 300 and a sleeve 210 connected to the angle plate 205. In an embodiment, the sleeve 210 can be an elongated hollow cylinder. The front end of the tractor 300 can be connected to the tongue assembly 105 by aligning the holes 131 with the sleeve 210 and inserting the rod 180 through the holes 131 and the sleeve 210. The pin 134 can be inserted through the holes 133 and into an aligned hole 181 on the rod 180.

This connection secures the tractor to the tongue assembly 105. At this point, the tongue assembly 105 is able to pivot about the rod 180.

FIG. 3 illustrates a close up view of a portion of an embodiment of a rear axle assembly 110 connected to the rear portion of a tractor 300. As discussed above, the support plate 160 is shown connected to the support beam 155 and interconnection plate 175 is connected to support plate 160. The interconnection plate 175 is not in use when the rear axle assembly 100 is connected to the tractor 300. The tractor 300 includes a reciprocal upper support device 215 adjacent and connected to the upper support device 165, and a reciprocal lower support device 220 adjacent and connected to the lower support device 170.

The lower support device 220 is typically connected to the unitized mainframe of the tractor 300. The upper support device 215 is connected to the tractor 300 at a area that aligns with the upper support device 165. In an embodiment, the lower support device 220 is a plate with holes (not shown) that can be aligned with the holes 166 on the upper support device 165. A pin 216 can be inserted through the holes to connect the upper support devices 165, 215. In an embodiment, the lower support device 220 is a drawbar that is adapted to engage the pintle hook used in an embodiment of the lower support device 170. The pintle hook used in the embodiment of the lower support device 170 typically includes a clasp 171 that can close the pintle hook to secure the drawbar used in the embodiment of the lower support device 220. The connection of the upper support devices 165, 215 and the lower support devices 170, 220 secures the tractor 300 to the rear axle assembly 110. The upper and lower support devices 215, 220 can be thought to work in conjunction as a rear axle connection assembly.

FIG. 4 illustrates a close up alternate view of a portion of an embodiment of a rear axle assembly 110 illustrating the connection of the upper support devices 165, 215.

FIG. 5 illustrates a close up alternate view of a portion of an embodiment of a rear axle assembly 110 illustrating the connection of the lower support devices 170, 220.

In one embodiment, the tongue connection assembly 200 including the angle plate 205 and the sleeve 210, as well as the upper and lower support devices 215, 220 as the rear axle connection assembly can be an integral part of the unitized mainframe of the tractor 300. In another embodiment, for those tractors and other heavy equipment vehicles, the tongue connection assembly 200 and rear axle connection assembly can be part of a transporter apparatus kit. The part of the kit including the tongue connection assembly 200 and the rear axle connection assembly can be permanently connected (such as by welding) to the unitized mainframe of a tractor or any suitable part of heavy equipment for use with the tongue assembly 105 and the rear axle assembly 110. The remaining part of the kit can include the transporter apparatus itself including the tongue assembly 105 and the rear axle assembly 110.

FIG. 6 illustrates a side view of an embodiment of a heavy equipment transporter system 500. The system includes a transporter apparatus 100 and a transporter vehicle 400 such as a dump truck. As described above, the transporter apparatus includes a tongue assembly 105 and a rear axle assembly 110. The tongue and rear axle assemblies 105, 110 have been connected together as described with respect to FIG. 1. In addition, a chain 196 has been connected to eyes 195 on each of the tongue and rear axle assemblies 105, 100. As described above, the addition of the chain 196 adds to further stabilize the transporter apparatus 100 when heavy equipment is not attached and the transporter apparatus 100 is being transported or stored. The figure illustrates the hauling assembly 125 connected to a trailer hitch 405 on the truck 400. As described above, the truck can include several types of hitches such as a pintle hook, gooseneck assembly and the like.

FIG. 6 further illustrates two support poles 190 on both the tongue assembly 105 and the rear axle assembly 110. In one embodiment, the apparatus includes only one support pole 190 that can be interchanged between the tongue assembly and the rear axle assembly 110. Typically, when the transporter apparatus 100 is connected as shown in the figure, and not attached to a truck, the transporter assembly apparatus 100 may require a support pole 190 on the tongue assembly 105 so that the transporter apparatus 100 can be properly stored without the hauling assembly 125 lying on the ground and bearing the weight. In contrast, when the tongue and rear axle assemblies 105, 110 are separated and awaiting to be connected to heavy equipment, the tongue assembly can lie on the ground. However, the rear axle assembly is typically rear-heavy and tends to rotate backward on the wheels 150. Therefore, it is useful to use the support pole 190 to keep the rear portion of the rear axle assembly up and off the ground. Further features such as the features just described are discussed in further detail below with respect to the operation of the transporter apparatus 100.

Transporter Apparatus Operation

The operation of the transporter apparatus 100 is now discussed. The transporter apparatus 100 itself as well as the connections of the tongue assembly 105 and the rear axle assembly 110 to heavy equipment has been discussed. There are a series of steps that are necessary in order for a heavy equipment operator to connect the transporter apparatus 100 to heavy equipment. As described above, the heavy equipment becomes part of a new trailer that is subsequently hauled by a transport vehicle. In essence, the transporter apparatus 100 is a transformer transporter because it transforms the heavy equipment and the transporter apparatus 100 into an entirely new entity. The new entity is essentially a trailer composed of the tongue assembly 105, the unitized mainframe of the heavy equipment and the rear axle assembly 110 in one unitary frame. The example using a typical tractor loader backhoe is once again illustrated in the following discussion.

FIG. 7A illustrates a side view of tractor loader backhoe 300 in proximity of an embodiment of a rear axle assembly 110. The rear axle assembly 110 has a pole support 190 and is tilted back slightly. The tractor 300 includes a front end loader 305, a backhoe 310 and stabilizers 315. The backhoe 310 is shown resting in the backhoe clearance space 142. In one implementation, the rear axle assembly can be maneuvered with the backhoe to interconnect the upper support devices 165, 215 and the lower support devices 170, 220.

FIG. 7B illustrates another side view of tractor loader backhoe 300 in proximity of an embodiment of a rear axle assembly 110. In this figure, the rear axle assembly 110 includes a support pole 190 making the mainframe 140 substantially parallel to the ground. In this arrangement, the operator of the tractor 300 can use both the backhoe 310 and the stabilizers 315 to maneuver the tractor 300 to connect the tractor 300 to the rear axle assembly 110. Typically, the operator can put out the stabilizers 315 for lateral support. The operator can then extend the backhoe 310 and lower it to the ground to actually lift the rear part of the tractor 300 until the rear wheels 325 of the tractor are raised off the ground and the tractor 300 pivots on the front wheels 320. Since most tractors are four wheel drive, the front wheels 320 can operate to move the tractor if necessary. The back hoe can be extended and retracted as well as raised and lowered in order for the operator to slowly rest the lower support device 220 connected to the unitized mainframe of the tractor 300 onto the lower support devices 170 on the rear axle assembly 110. When the lower support devices 170, 220 are connected in this manner, the holes 166, 217 on the upper support devices 165, 215 are aligned. The operator or another person can then insert the pin 216 through the holes of the upper support devices 165, 215 as discussed with respect to FIG. 3.

FIG. 7C illustrates a side view of a tractor loader backhoe 300 connected to an embodiment of a rear axle assembly 110. In this figure, the unitized mainframe of the tractor 300 has been connected to the rear axle assembly 110, wherein the upper support devices 165, 215 and the lower support devices 170, 220 have been connected. At this point the operator can retract the backhoe 310 and raise the stabilizers 315. In essence, the tractor 300 and the rear axle assembly 110 have become a new vehicle. In this configuration, the operator typically drives the tractor 300 using the power to the front wheels 320 since the rear wheels 325 are raised off the ground. The operator can drive this transformed vehicle to a place where the tongue assembly 105 is located, typically nearby and preset near the front of the tractor.

FIG. 7D illustrates a side view of a tractor loader backhoe 300 connected to an embodiment of a rear axle assembly 110 and to an embodiment of a tongue assembly 105. A chain, for example, can be connected to the front end loader 305 and the tongue assembly 105. The operator then lifts the front end loader 305 thereby lifting the tongue assembly 105 to a desired level. The operator then connects the tongue connection assembly 200 to the tongue assembly 105 as described with respect to FIG. 2. The operator then lifts the front end loader 305 which in turn lifts the tongue assembly that is pivoting about the rod 180 (see FIG. 2). The operator can then use the front end loader 305 and drive the tractor 300 connected to the rear axle assembly 110 to maneuver the hauling assembly 125 onto the hitch 405 of the truck 400. The tongue assembly 105 can then be appropriately secured to the truck 400. At this point, the front wheels 320 are still on the ground. The operator can then lower the front end loader 305 onto the front loader rests 135 on the tongue assembly 105 and push down on the tongue assembly 105. By pushing down on the tongue assembly 105, the tongue assembly pivots about both the hauling assembly 125 and the rod 180 thereby lifting the front wheels 320 off the ground until the tongue assembly 105 is substantially parallel to the ground. The hydraulics of the front end loader 305 keep it in place. In an implementation, the backhoe 310 can be extended outward once again to provide a gravitational torque on the tractor, thereby making the front a little lighter to make it easier to push down on the tongue assembly 105.

The front wheels 320 are mounted on an axle that typically moves up and down when it is lifted off the ground. Therefore, a chain can be connected between the wheels 320 and the front end loader to keep the wheels 320 from moving up and down. At anytime, the backhoe can be placed in the backhoe clearance space 142.

The tractor 300 can subsequently be powered off for transport.

Heavy Equipment Transporter/Transformer System

FIG. 7E illustrates a side view of an embodiment of a heavy equipment transporter/transformer system 600. As discussed above, when the tongue assembly 105 and the rear axle assembly 110 are connected to the unitized mainframe of the tractor 300, the tongue assembly 105, the tractor 300 and the rear axle assembly 110 all work together as a new unitary trailer 605 having one continuous frame. When the truck 400 is added, the system 600 is formed. The term transporter/transformer means that the system functions to not only transport a piece of heavy equipment such as a tractor loader backhoe 300, but also functions to transform the constituent pieces, the tongue assembly 105, the tractor 300 and the rear axle assembly 110, into the new unitary trailer 605. As shown in the figure, the wheels 320, 325 are clear off the ground but also provides a lower center of gravity. If there is rough road, if the wheels 320, 325 do contact the road, they simply roll.

The foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A heavy equipment transporter apparatus, comprising:
    a tongue assembly having a first end and a second end, the tongue assembly including two elongated side beams and a plurality of cross beams connected between the side beams;
    a rear axle assembly connected to the tongue assembly, the rear axle assembly including a mainframe having a first end and a second end;
    a first set of interconnection plates having aligned holes and connected to the upper portion of the second end of the side beams;
    a second set of interconnection plates having aligned holes and connected to the first end of the mainframe of the rear axle assembly, wherein the holes on the first and second interconnection plates are adapted to be aligned and are further adapted to receive an elongated rod through the holes, wherein the second set of interconnection plates are each connected to a respective support plate having an upper and lower end, the support plates being substantially parallel and connected substantially perpendicular to the mainframe;
    upper support devices connected to the upper ends of the support plates; and
    lower support devices connected to the lower ends of the support plates.

2. The apparatus as claimed in claim 1 further comprising rests located on the upper portion of the side beams.

3. The apparatus as claimed in claim 1 further comprising two parallel side walls located on the mainframe of the rear axle assembly forming an elongated space between the walls.

4. The apparatus as claimed in claim 1 further comprising an axle connected to the mainframe and wheels connected to the axle.

5. The apparatus as claimed in claim 4 wherein the axle is a dual axle.

6. The apparatus as claimed in claim 1 further comprising a hauling assembly connected to the first end of the tongue assembly.

7. A heavy equipment transporter kit, comprising:
    a transporter having a tongue assembly and a rear axle assembly, the rear axle assembly having an upper and lower support device;
    a rear axle connection assembly adapted to be permanently connected to the rear of heavy equipment; and a tongue connection assembly adapted to be permanently connected to the front of heavy equipment having a unitized mainframe, wherein the tongue connection assembly comprises an angle plate adapted to permanently connect to the unitized mainframe of heavy equipment and a sleeve connected to the angle plate.

8. The kit as claimed in claim 7 wherein the rear axle connection assembly comprises an upper support device and a lower support device, the upper and lower support devices being adapted to reciprocally interconnect with the upper and lower support devices of the rear axle assembly.

9. The kit as claimed in claim 7 wherein the rear axle connection assembly is connected to the unitized mainframe of the heavy equipment.

10. A trailer, comprising:
a unitized mainframe of a front end loader backhoe, the mainframe having a front end including an angle plate and a sleeve connected to the angle plate and a rear end including a first set of upper support devices;
a tongue assembly having interconnection plates connected to the sleeve on the front end of the unitized mainframe; and
a rear axle assembly having a mainframe including a front and rear end, the front end including support plates connected generally perpendicular to the mainframe and a second set of upper support devices connected generally perpendicular to the support plates and to the first set of upper support devices connected to the rear end of the unitized mainframe.

11. A heavy equipment transporter system, comprising:
a heavy equipment transporter apparatus having a tongue assembly having interconnection plates and a rear axle assembly having a mainframe including a front and rear end, the front end including support plates connected generally perpendicular to the mainframe and a first set of upper support devices connected generally perpendicular to the support plates;
a piece of heavy equipment having a front end and a rear end, the front end including a sleeve, the rear end including a second set of upper support devices wherein interconnection plates on the tongue assembly is connected to the sleeve on the front end of the piece of heavy equipment and the first set of upper support devices on the rear axle assembly is connected to the second set of upper support devices on the rear end of the piece of heavy equipment; and
a transporter vehicle connected to the tongue assembly.

12. A method of preparing a tractor front end loader backhoe having stabilizers for transportation, comprising:
providing a rear axle assembly having a mainframe and support plates connected generally perpendicular to one end of the mainframe, the support plates having upper and lower support devices connected generally perpendicular to the support plates;
extending the backhoe of the tractor having upper and lower support devices connected to the rear of the tractor and an angle plate and sleeve connected to the front of the tractor, the back hoe being extended over the rear axle assembly;
lifting the rear wheels of the tractor by pressing the backhoe into the ground;
aligning and resting the tractors lower support devices on the lower support devices on the rear axle assembly;
aligning and connecting the upper support devices of the rear axle assembly and the tractor;
driving the tractor using the front wheels to a tongue assembly having interconnection plates;
connecting the tongue assembly to the front end loader of the tractor;
lifting the tongue assembly and connecting the interconnection plates to the sleeve on front end of the tractor;
connecting the tongue assembly to a transporting vehicle; and
pressing down on the tongue assembly with the front end loader to lift the front wheels of the tractor off the ground.

13. The method as claimed in claim 12 further comprising optionally extending the stabilizers of the tractor when connecting the rear axle assembly to the tractor.

14. The method as claimed in claim 12 further comprising optionally extending the backhoe while pressing down on the tongue assembly.

15. The method as claimed in claim 12 further comprising resting the backhoe on the rear axle assembly.

16. The method as claimed in claim 12 further comprising securing the front wheels to the front end loader.

* * * * *